Dec. 15, 1959 P. H. DALLE MURA ET AL 2,917,716
PULSE GENERATOR
Filed Aug. 26, 1957
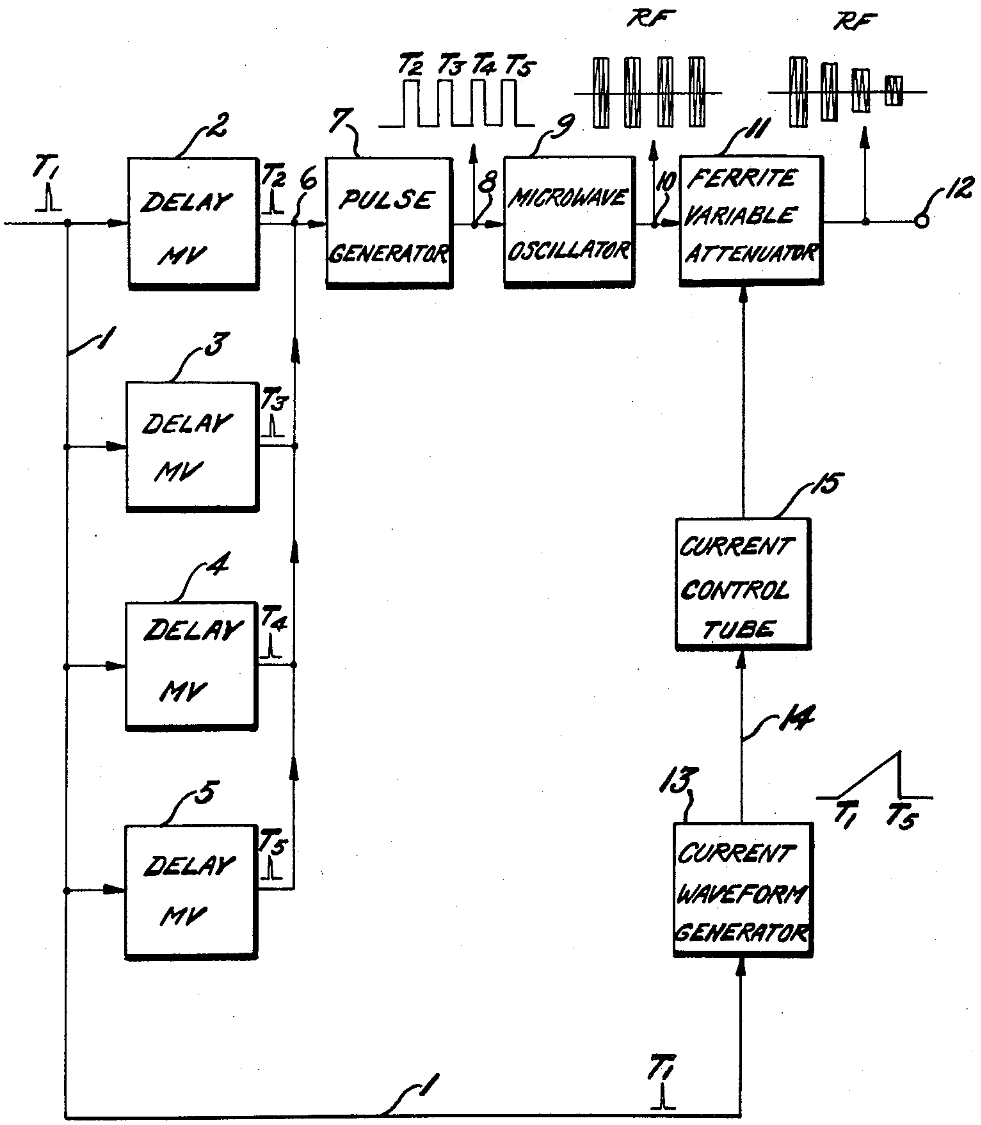
INVENTORS
PIO H. DALLEMURA
AND AUGUST W. MEYER
BY Wade Koontz
George Fine
ATTORNEYS

United States Patent Office

2,917,716

Patented Dec. 15, 1959

2,917,716

PULSE GENERATOR

Pio H. Dalle Mura, Baltimore, and August W. Meyer, Catonsville, Md., assignors, by mesne assignments, to the United States of America as represented by the Secretary of the Air Force

Application August 26, 1957, Serial No. 680,370

3 Claims. (Cl. 332—14)

This invention relates to a signal generator and more particularly to a microwave pulse generator utilized in testing radar systems.

Many radar systems require the use of multi-channel receivers. In order that the receiving system operate properly, it is necessary that the gain response of each receiver channel be matched with that of adjacent channels over the dynamic range.

The performance of such a gain matching function requires a monitoring system which includes a simulated signal source to introduce equal test signals into each receiver channel. This test signal may be a series of stepped pulses whose amplitudes vary over the dynamic range of the receiver.

It is an object of this invention to provide a microwave pulse generator for producing amplitude-stepped pulses to be utilized as simulated signals for a radar system.

It is a further object of this invention to provide a pulse generator whose output pulse envelope shape may be controlled.

A still further object of this invention is to provide a pulse generator with short pulse intervals.

Another object of this invention is to provide a pulse generator which produces amplitude-stepped pulses over a broad frequency band.

These and other objects will become apparent to those skilled in the art upon consideration of the following description, with reference to the accompanying drawing, which is a block diagram of an amplitude-stepped pulse generator.

According to the present invention, common trigger signal $T_1$ is fed to delay multivibrators 2, 3, 4 and 5 by way of line 2. Each of multivibrators 2, 3, 4 and 5 have a different delay time. The output signals of delay multivibrators 2, 3, 4, and 5 are signals $T_2$, $T_3$, $T_4$ and $T_5$ respectively which are combined at point 6 to produce a series of four triggers in time sequence. These four triggers are then fed to pulse generator 7 whose output is a series of four rectangular pulses as shown at point 8.

The four rectangular pulses present at point 8 are fed to microwave oscillator 9. The output of microwave oscillator 9 is thus a series of four microwave pulses, each of which has the same amplitude. This is shown at point 10. These are then sent through variable ferrite attenuator 11 at the same time its attenuation property is being varied from minimum to maximum. This produces four microwave pulses in time sequence which are successively stepped down in amplitude by a controllable amount. The amount of attenuation between the largest and the smallest pulses is determined by the attenuation range of variable ferrite attenuator 11. The four microwave amplitude-stepped pulses are shown at output 12.

The same trigger $T_1$ used to actuate the modulating pulse series is employed to insure synchronization between the start of the four microwave pulses and the start of the increasing attenuation operation. This is accomplished by allowing common trigger $T_1$ to be fed by way of line 1 to sawtooth current waveform generator

13. The output of generator 13 as shown by the waveform on line 14 is a sawtooth signal beginning at time $T_1$ and terminating at time $T_5$. This sawtooth signal is fed through current control tube 15 to ferrite variable attenuator 11. This sawtooth signal regulates the attenuation of ferrite attenuator 11 by controlling its magnetic field.

The shape of the four output pulses can be controlled, within limits, by means of (1) the shape of the current control signal, and (2) the relative time positions of the four modulating pulses. For example, logarithmically decreasing pulses can be approximated if desired.

As the ferrite attenuator is comparatively broadband, the pulse frequency can be varied to a reasonable degree without deteriorating the output pulses.

Although in accordance with the provisions of the patent statutes this invention is described as embodied in concrete form and the principle thereof described, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What is claimed is:

1. An amplitude-stepped pulse generator comprising parallel multivibrators, each having a different delay time, said multivibrators having common input and output circuits, the said input circuit receiving a single actuating signal and said output circuit combining a trigger sgnal from each of said multivibrators to provide a series of trigger signals in time sequence, a pulse generator controlled by said series of trigger signals in such a manner so as to provide a series of rectangular pulses corresponding in time sequence to that of said series of trigger signals, a microwave oscillator modulated by said series of rectangular pulses thereby providing an output of a series of microwave pulses, each of which has the same amplitude and which corresponds in time sequence to said series of modulating rectangular pulses, and a ferrite variable attenuator which progressively varies the amplitude of said series of microwave pulses, said ferite variable attenuator being controlled by a current waveform generator actuated by said single actuating signal.

2. An amplitude-stepped pulse generator comprising multiple multivibrator means having common input terminals and common output terminals, said input terminals receiving a common actuating signal, each of said multivibrators producing a trigger pulse with a separate time delay, means to generate a rectangular pulse for each of said delayed trigger pulses, said rectangular pulses being of equal amplitude, means to pulse modulate a microwave oscillator with each of said pulses to produce an R.F. microwave pulse for each of said rectangular pulses, each of said R.F. microwave pulses being of equal amplitude, and means to progressively attenuate each of said equal amplitude R.F. microwave pulses, said attenuating means controlled by said common actuating signal.

3. An amplitude-stepped pulse generator as defined in claim 2 wherein said attenuating means is comprised of a current waveform generator controlled by said common actuating signal, and a ferrite variable attenuator operating to attenuate said equal amplitude R.F. microwave pulses in accordance with a logarithmic output signal from said current waveform generator.

References Cited in the file of this patent

UNITED STATES PATENTS 2,225,741 Gunaella ---------------- Dec. 24, 1940